United States Patent
Jackson

(10) Patent No.: US 7,384,465 B2
(45) Date of Patent: Jun. 10, 2008

(54) PIGMENTED BLUE INKJET INK COLOR REPRODUCTION

(75) Inventor: Christian Jackson, Wilmington, DE (US)

(73) Assignee: E.I. du Pont de Nemours & Co., Wilmington, DE (US)

( * ) Notice: Subject to any disclaimer, the term of this patent is extended or adjusted under 35 U.S.C. 154(b) by 71 days.

(21) Appl. No.: 11/153,197

(22) Filed: Jun. 15, 2005

(65) Prior Publication Data

US 2005/0284330 A1    Dec. 29, 2005

Related U.S. Application Data

(60) Provisional application No. 60/583,234, filed on Jun. 25, 2004.

(51) Int. Cl.
*C09D 11/02*    (2006.01)
*B41J 2/01*    (2006.01)

(52) U.S. Cl. .................. 106/31.6; 106/31.86; 347/100
(58) Field of Classification Search ............... 106/31.6, 106/31.86; 347/100
See application file for complete search history.

(56) References Cited

U.S. PATENT DOCUMENTS

| | | | |
|---|---|---|---|
| 5,085,698 A | | 2/1992 | Ma et al. |
| 5,231,131 A | | 7/1993 | Chu et al. |
| 5,788,759 A | * | 8/1998 | Takao et al. ................. 106/498 |
| 5,800,607 A | * | 9/1998 | Schnaitmann et al. ...... 106/412 |
| 6,426,014 B1 | | 7/2002 | Silverbrook |
| 6,443,555 B1 | | 9/2002 | Silverbrook et al. |
| 6,544,325 B2 | * | 4/2003 | Hall-Goulle et al. ......... 106/410 |
| 6,742,869 B2 | | 6/2004 | Redding et al. |
| 6,815,474 B2 | * | 11/2004 | Malanga et al. ............. 523/414 |
| 6,852,156 B2 | | 2/2005 | Yeh et al. |
| 2001/0047740 A1 | * | 12/2001 | Wada et al. ................. 106/413 |
| 2002/0014183 A1 | * | 2/2002 | Hall-Goulle et al. ........ 106/410 |
| 2002/0033863 A1 | | 3/2002 | Silverbrook |
| 2003/0128246 A1 | | 7/2003 | Redding et al. |
| 2004/0261662 A1 | * | 12/2004 | Grandidier et al. ......... 106/498 |
| 2005/0048384 A1 | * | 3/2005 | Saikatsu et al. ................ 430/7 |
| 2005/0131114 A1 | * | 6/2005 | Sunahara et al. ............. 524/88 |
| 2005/0235867 A1 | * | 10/2005 | Jackson et al. ........... 106/31.27 |
| 2005/0284329 A1 | * | 12/2005 | Jackson et al. ............. 106/31.6 |
| 2006/0014855 A1 | * | 1/2006 | House et al. ............... 523/160 |

FOREIGN PATENT DOCUMENTS

| | | |
|---|---|---|
| EP | 0 556 649 B1 | 8/1993 |
| GB | 2 370 580 A | 7/2002 |

OTHER PUBLICATIONS

International Search Report dated Nov. 15, 2005.

* cited by examiner

*Primary Examiner*—Helene Klemanski

(57) ABSTRACT

The present invention pertains to a blue pigmented inkjet ink and uses thereof in inkjet ink sets and inkjet printing. More particularly, the present invention pertains to an ink that is blue in color and comprises a mixed pigment colorant.

12 Claims, No Drawings

PIGMENTED BLUE INKJET INK COLOR REPRODUCTION

CROSS-REFERENCE TO RELATED APPLICATION

This application claims priority under 35 U.S.C. §119 from U.S. Provisional Application Ser. No. 60/583,234 (filed Jun. 25, 2004), the disclosure of which is incorporated by reference herein for all purposes as if fully set forth.

BACKGROUND OF THE INVENTION

The present invention pertains to a pigment based inkjet ink and uses thereof in inkjet ink sets and inkjet printing. More particularly, the present invention pertains to an ink that is blue in color and comprises a mixed pigment colorant.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers. Suitable inks include inks with dye, pigment and mixed dye/pigment colorants.

Color characteristics of pigment-containing inks play an important role in the quality of the printed ink-jet image. Perceived color quality can be characterized using any one of several color-space systems such as CIELAB (CIE No.15.2, *Colorimetry*, 2nd. Ed., Commission Internationale de I'Eclarage, Vienna, Austria, 1986) or Munsell (*Munsell Book of Color*, Munsell Color Co., Baltimore, Md., 1929), as is well known in the art. With respect to Munsell color space, a given color is defined using three terms, namely Hue, Value and Chroma. With respect to CIELAB color space, a color is defined using three terms L*, a* and b*. In this system L* defines the lightness of the color and it ranges from 0 (black) to 100 (white). The terms a* and b* together define the hue, where a* ranges from a negative number (green) to a positive number (red) and b* ranges from a negative number (blue) to a positive number (yellow). Additional terms such as hue angle (h°) and chroma (C*) can also be used to describe a given color instead of a* and b* wherein $$h^o = \tan^{-1}\left(\frac{b^*}{a^*}\right) \qquad \text{Equation 1}$$

$$C^* = \sqrt{a^{*2} + b^{*2}} \qquad \text{Equation 2}$$

To achieve full color images, ink jet printers typically employ a cyan ("C"), magenta ("M") and yellow ("Y") ink. These colors are known as subtractively-mixing primaries, as light is subtracted as it passes through the colorant. When these colors are mixed in pairs they form red, green and blue (so-called "secondaries"), and when all are mixed together they form black. Thus these three-color inks can be used to print the entire range of hues with good chromaticity and/or color saturation.

The range of colors that a given ink set can print is called the color gamut, and can be described in the CIELAB system by the volume in the L*a*b* color space that encompasses a palette of representative colors that can be printed by the ink set on a given substrate. While a CMY ink set can produce all possible color hues, the color gamut does not encompass all the colors that can be perceived by the human eye. Thus there is still a desire to improve the printed image quality and extend the range of colors that can be printed.

Although current ink sets provide desirable images, inks with improved coloristic properties are still advantageous. It is an objective of this invention to provide a pigmented blue ink with improved chroma, optical density and gloss.

SUMMARY OF THE INVENTION

In accordance with one aspect of the present invention, there is provided a blue ink-jet ink comprising a pigment colorant and a vehicle, preferably an aqueous vehicle, wherein the pigment colorant comprises a mixture of pigment violet 23 (PV 23) and at least one cyan pigment.

The cyan pigment is preferably selected from pigment blue 15:3 (PB 15:3) and 15:4 (PB 15:4). The weight ratio of PV 23 to the total amount of cyan pigment present in the ink is preferably between about 4:1 to about 1:4. Preferably the total amount of PV 23 and cyan pigment is at least 1% by weight, based on the total weight of the ink. Also preferably, the vehicle is an aqueous vehicle.

The blue pigmented ink of the present invention has been found to provide desirable coloristic properties including favorable hue and high chroma, optical density, and gloss.

In accordance with another aspect of the present invention, there is provided an ink jet ink set comprising a plurality of colored inks, wherein at least one of the inks is a blue pigmented ink as set forth above and as described in further detail below. Preferably, the ink set comprises a cyan, magenta and yellow pigmented ink in addition to the blue pigmented inkjet ink and, more preferably, a red and green pigmented ink as well. Also preferably the ink set further comprises a black ink.

In accordance with yet another aspect of the present invention, there is provided an inkjet printer responsive to digital data signals, which has been equipped with an inkjet ink or inkjet ink set as described above. Preferably the printer is further equipped with a page-wide printhead array.

In yet another aspect of the present invention, there is provided a method for ink jet printing onto a substrate, comprising the steps of:

(a) providing an ink jet printer that is responsive to digital data signals;

(b) loading the printer with a substrate to be printed;

(c) loading the printer with an inkjet ink or inkjet ink set as set forth above and described in further detail below; and (d) printing onto the substrate using the ink or inkjet ink set in response to the digital data signals.

Preferred substrates include plain paper, photo paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colored Inks

Colored inks comprise a vehicle, preferably an aqueous vehicle, and a colorant. The colorant can be soluble (dye) and/or dispersed (pigment) in the ink vehicle. Pigmented inks comprise at least one pigment. Pigmented inks may further comprise dye, but the colorant is still predominately pigment.

Colorants are referred to herein by their "C.I." designation established by Society Dyers and Colourists, Bradford, Yorkshire, UK and published in the *The Color Index*, Third Edition, 1971. That designation uses a perceived color as part of the name, but there is no formal spectral definition of what constitutes orange, red, violet, blue, green, etc. For the purposes of this invention, ink color will be named according to hue angle ranges as follows.

| Color | Hue Angle Range |
| --- | --- |
| Red | 10-70 |
| Yellow | 70-120 |
| Green | 120-180 |
| Cyan | 180-250 |
| Blue | 250-320 |
| Magenta | 320-10 |

In choosing colorants for an inkjet ink set, the hue angle for a given color preferably falls within the following ranges.

| Color | Hue Angle Range |
| --- | --- |
| Red | 15-65 |
| Yellow | 75-110 |
| Green | 135-165 |
| Cyan | 195-230 |
| Blue | 265-305 |
| Magenta | 325-360 |

The hue angle is preferably determined by printing an ink onto high quality inkjet media, such as photo paper, and measuring the color with a spectrometer, as generally understood by those of ordinary skill in the art, and as explained in further detail below.

The blue ink of the present invention comprises a mixture of at least one cyan pigment (preferably PB 15:3 and/or PB 15:4) and PV 23. Although by the color definitions above PV 23 is a blue pigment, it borders on magenta and is less than desirably positioned as a blue colorant. However, in combination with a cyan pigment, the color is optimized to provide a very desirable blue color. Typically, the amount of pigment colorant in the ink will be at least about 1 percent by weight, based on the total weight of the ink. The weight ratio of PV23 to cyan pigment is typically from about 1:4 to about 4:1, and preferably from about 1:3 to about 3:1.

As described herein after, the inventive blue ink will generally be employed as a member of an ink set comprising a plurality of colored inks. The colored inks other than the present blue ink may be pigment and/or dye based inks. Each of the inks in the ink set individually comprises a colorant dispersed and/or dissolved in the vehicle.

Useful pigments for the other inks of the ink set include:
(cyan) PB 15:3 and PB15:4;

(magenta) Pigment Red 122 and/or Pigment Red 202;

(yellow) Pigment Yellow 14, Pigment Yellow 74, Pigment Yellow 95, Pigment Yellow 110, Pigment Yellow 114, Pigment Yellow 128 and Pigment Yellow 155;

(red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264;

(green) Pigment Green 1, Pigment Green 2, Pigment Green 7 and Pigment Green 36; and (black) carbon black.

Pigmented inks other than the present blue ink may comprise a single pigment species, or mixtures of two or more pigment species. The "pigment content" in a given ink refers the total pigment present in that ink, whether a single pigment species or a combination of two or more pigment species.

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. Thus, pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Vehicle

The vehicle can be any suitable vehicle but is preferably an "aqueous vehicle" by which is meant water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organo-silicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products. The solvents may also be comprised in part, or entirely, or polymerizable solvents such as solvents which cure upon application of UV light (UV curable).

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Other Ingredients

Other ingredients may be formulated into the inkjet ink, to the extent that such other ingredients do not interfere with the stability and jetablity of the ink, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or non-ionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylgly-cine (DHEG), trans-1,2-cyclohex-anediaminetetraacetic acid (CyDTA), dethylenetriamine-N,N,N',N'',N''-pentaacetic acid (DTPA), and glycoletherdiamine-N,N,N ',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, by weight based on total weight of the ink.

In a colored ink, colorant will generally be present in amounts up to about 12%, and more typically in the range of about 1% to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight based on the total weight of the ink. Polymers, other than polymeric fixing agents, can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and less than about 3.5 cps.

Ink Set

The term "ink set" refers to all the fluids an inkjet printer is equipped to jet. These fluids include the colored inks referred to above. Other inks (or fluids) could also be present such as, for example, an additional colorless ink containing a durability or gloss enhancing ingredient which would be applied after all of the colored inks (a "topcoat") to increase abrasion resistance and/or gloss of the printed images. Another type of such fluid is a (preferably colorless) fixer fluid, such as disclosed in commonly owned U.S. application Ser. No. 11/013128 (filed Dec. 15, 2004), claiming priority from U.S. Provisional Application No. 60/533068

(filed 29 Dec. 2003), the disclosures of which are incorporated by reference herein for all purposes as if fully set forth.

As indicated above, the blue ink of the present invention will typically be used as part of an ink set comprising a plurality of colored inks. Usually, an ink set will include inks with the primary colors, CYM, and the inventive blue ink would then provide an expanded color set. It is advantageous to use the same cyan pigment in the inventive mixed pigment blue ink as is used in the cyan ink of the ink set.

In addition to blue, the ink set can be advantageously expanded with other colors, especially the secondary colors red (R) and green (G). Thus, a preferred ink set can include CYMRGB wherein the blue ink is the inventive blue ink prescribed herein.

A six color ink set of primary and secondary colors, CYMRGB, can comprise:

a cyan ink with colorant a selected from one or any combination of PB 15:3 and/or PB 15:4;

a magenta ink with PR 122;

a yellow ink with colorant a selected from one or any combination of PY 74, 95, 110, 128 and 155;

a red ink with a colorant selected from one or any combination of PO 34, PR 149, PR 177, PR 178 and PR 264;

a green ink with PG 36; and a blue ink in accordance with the present invention.

Any or all of the R and G inks in the six-color set can comprise colorant that is a mixture of CYM pigments as set forth herein before.

A red ink can comprise mixed M/Y colorant comprising at least one magenta pigment, preferably PR 122, and at least one yellow pigment preferably selected from the group consisting of PY 74, PY 95, PY 110, PY 128 and PY 155.

A green ink can comprise mixed C/Y colorant comprising at least one cyan pigment preferably selected from the group consisting of PB15:3 and PB15:4, and at least one yellow pigment preferably selected from the group consisting of PY 74, PY 95, PY 110, PY 128 and PY 155.

The ink set can further comprise a black ink, preferably a pigment-based black ink, and especially a black ink comprising carbon black pigment.

Each of the inks in the ink set individually comprises a vehicle, preferably an aqueous vehicle, the appropriate colorant and optional additives, in the ingredient proportions and having the properties as described above.

Printer

The printer can be any suitable inkjet printer, including those that are commercially produced and widely available. Such printers are well known to one skilled in the art.

Such printers can be, for example, those equipped with a printhead array that is fixed in position (fixed array).

The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and US20020033863 (the disclosures of which are also incorporated by reference herein for all purposes as if fully set forth). Ink jet printers are responsive to digital data signals.

The fixed array printers will generally be capable of printing at least about 600 dpi, preferably at least about 1200 dpi, and more preferably at least about 1600 dpi. Printing is preferably accomplished in one pass and thus the printhead is configured to achieve the stipulated dpi in a single pass of the substrate through the print zone.

The width of the printing zone is at least as wide as the width of the area to be printed so that printing can be performed rapidly in one pass. Accordingly, printheads of this sort are commonly referred to as page-wide arrays or full-width arrays. For so-called "SOHO" (small office, home office) and "network" printing, the width of the printing zone is at least wide as standard papers, such as A4 size paper and/or letter size (8.5×11 inch) paper. For so-called "wide-format" printing, the print zone is preferably at least about 36 inches wide and can accommodate media that is fed from a roll.

Although the ink droplets ejected from a printhead can be of any suitable volume, preferably droplets are less than about 10 pL, and more preferably in the range of about 1 to about 5 pL, even more preferably about 1 to about 2 pL.

Substrates

Substrates suitable for use in the present invention can be any useful substrate known to those of ordinary skill in the relevant art. For example, the substrate can be plain paper such as common electrophotographic copier paper. The substrate can also be specialty media such as microporous papers, polymer coated papers and hybids of the two. The substrate can be polymeric film such as vinyl chloride and polyester. Polymeric films are especially useful in wide-format applications such as signs, billboards and banners. The substrate can be a non-woven textile such as spun bonded polyolefin (e.g. Tyvek®, DuPont Co.). The substrate can also be woven textile such as silk, cotton, nylon and polyester.

EXAMPLES

Structured polymers were employed as dispersants. Dispersant A was a block co-polymer of benzyl methacrylate and methacrylic acid (13//10). Dispersant B was a graft co-polymer of POEA-g-ETEGMA/methacrylic acid (66-g-4/30), where POEA means phenoxyethyl acrylate and ETEGMA means ethoxytriethyleneglycol methacrylate. Exemplary preparative methods are described in U.S. Pat. No. 6,742,869 (the disclosure of which is incorporated by reference herein for all purposes as if fully set forth) under the headings "Dispersant 1" and "Dispersant 2".

Dispersion 1

PB 60 was milled with dispersant A neutralized with KOH (pigment/dispersant weight ratio of 4.0) in a 2-roll mill. The resulting chip was let down into water to make a concentrated dispersion with 15% by weight pigment.

Dispersion 2

PV 23 was milled as an aqueous mixture with dispersant B neutralized with KOH (pigment/dispersant weight ratio of 1.5) in a media mill. The resulting slurry was diluted with water to make a concentrated dispersion with 15% by weight pigment.

Dispersion 3

PB 15:4 was milled with dispersant A neutralized with KOH (pigment/dispersant weight ratio of 1.5) in a 2-roll mill. The resulting chip was let down into water to make a concentrated dispersion with 15% by weight pigment.

Dispersion 4

PR 122 was milled with dispersant A neutralized with KOH (pigment/dispersant weight ratio of 1.5) in a 2-roll mill. The resulting chip was let down into water to make a concentrated dispersion with 15% by weight pigment.

Preparation of Inks

Inks were prepared according to the following formulations. Ingredients were mixed together and filtered. Water was deionized. Surfynol® 465 is a surfactant from Air Products Corp (Allentown, Pa., USA). Proxel® GXL is a Biocide from Avecia (Wilmington, Del., USA). Proportions are percent weight of the total weight of ink, unless otherwise specified.

| Ingredients | Ink A | Ink B | Ink C | Ink D | Ink E | Ink F | Ink 1 | Ink 2 | Ink 3 |
|---|---|---|---|---|---|---|---|---|---|
| Dispersion 1 (as % pigment) | 2.0 | 3.0 | 4.0 | — | — | — | — | — | — |
| Dispersion 2 (as % pigment) | — | — | — | 4.0 | — | — | 1.0 | 1.5 | 2.0 |
| Dispersion 3 (as % pigment) | — | — | — | — | 4.0 | 1.5 | 1.0 | 1.5 | 2.0 |
| Dispersion 4 (as % pigment) | — | — | — | — | — | 2.5 | — | — | — |
| 1,2-hexanediol | 4.0 | 4.0 | 4.0 | 4.0 | 4.0 | 4.0 | 4.0 | 4.0 | 4.0 |
| Glycerol | 10.0 | 10.0 | 10.0 | 10.0 | 10.0 | 10.0 | 10.0 | 10.0 | 10.0 |
| Ethylene glycol | 5.0 | 5.0 | 5.0 | 5.0 | 5.0 | 5.0 | 5.0 | 5.0 | 5.0 |
| 2-pyrrolidone | 3.0 | 3.0 | 3.0 | 3.0 | 3.0 | 3.0 | 3.0 | 3.0 | 3.0 |
| Surfynol ® 465 | 0.2 | 0.2 | 0.2 | 0.2 | 0.2 | 0.2 | 0.2 | 0.2 | 0.2 |
| Water (balance to 100%) | bal | bal | bal | bal | bal | bal | bal | bal | bal |
| Properties | | | | | | | | | |
| Conductivity (ms/cm) | 0.329 | 0.441 | 0.549 | | | | 0.818 | 1.052 | 1.335 |
| PH | 8.18 | 8.16 | 8.15 | | | | 8.25 | 8.26 | 8.24 |
| Viscosity (cps, 25° C.) | 2.17 | 2.39 | 2.66 | | | | 2.40 | 2.73 | 3.16 |

Color Measurements

Inks were evaluated by printing with a Canon i550 printer (100% coverage) and measuring color with a Greytag-Macbeth Spectrolino spectrometer and gloss (20° and 60°) with a Byk-Gardner micro-Tri-glossmeter.

Example

The inks were printed on Epson Premium Glossy Photo Paper and the optical density, chroma, hue angle and gloss were measured. Results are summarized in the following table.

| Ink | Optical Density | Chroma | Hue | 20° Gloss | 60° Gloss |
|---|---|---|---|---|---|
| Ink A | 1.01 | 61 | 267 | 49 | 89 |
| Ink B | 1.32 | 69 | 274 | 43 | 85 |
| Ink C | 1.47 | 73 | 285 | 40 | 79 |
| Ink D | 1.90 | 88 | 310 | 91 | 132 |
| Ink E | 2.03 | 75 | 247 | 33 | 85 |
| Ink F | 1.43 | 77 | 289 | 32 | 78 |
| Ink 1 | 1.28 | 79 | 293 | 91 | 119 |
| Ink 2 | 1.44 | 82 | 296 | 70 | 109 |
| Ink 3 | 1.50 | 82 | 297 | 51 | 97 |

The inventive blue ink (Inks 1-3) is advantageous in that it provided a better combination of chroma, optical density and gloss than a comparative ink with a single blue pigment (Inks A, B and C) or a comparative ink with mixed cyan and magenta pigments (Ink F).

Also, advantageously, it was found that the "bronzing" in the inventive mixed pigment blue ink was substantially less than for either of the individual pigments. Bronzing is considered an objectionable property and preferably inks exhibit little or no bronzing. Ink D with only PV 23 showed a significant amount of yellow bronzing (yellow reflection from the printed surface when viewed at an angle). Ink E with PB 15:4 showed a significant amount of pink/red bronzing (red reflection from the printed surface when viewed at an angle). Surprisingly, the inventive ink (Inks 1-3), comprised of a PV23/PB15:4 mixture, showed substantially less bronzing than both D and E. Comparative blue Inks A-C, with PB60 pigment, also showed a pink/red bronzing, although at levels less than comparative cyan Ink E. The level of bronzing in comparative blue Ink C was about the same as inventive blue Ink 3.

Example 2

The performance on plain paper (Xerox 4024 and HP Bright White) of the inventive blue ink and the comparative single pigment blue ink is summarized in the following table.

| | Xerox 4024 plain paper | | | HP Bright White Paper | | |
|---|---|---|---|---|---|---|
| Ink | Optical Density | Chroma | Hue | Optical Density | Chroma | Hue |
| Ink A | 0.72 | 46 | 273 | 0.66 | 48 | 275 |
| Ink B | 0.82 | 46 | 277 | 0.76 | 48 | 277 |
| Ink C | 0.86 | 45 | 279 | 0.81 | 47 | 279 |
| Ink 1 | 0.76 | 40 | 289 | 0.75 | 46 | 291 |
| Ink 2 | 0.80 | 38 | 289 | 0.78 | 43 | 291 |
| Ink 3 | 0.84 | 38 | 290 | 0.81 | 41 | 291 |

The results show the inventive blue ink also provided good performance on plain (non-glossy) paper, with color at least comparable to the single pigment ink (Inks A-C). Of course with the inventive mixed pigment blue, the ratio of pigments can be adjusted to shift the hue angle to the most desired location.

The invention claimed is:

1. An inkjet ink set comprising a plurality of differently colored inkjet inks, wherein at least one of the inks is a blue inkjet ink comprising a pigment colorant and a vehicle, wherein the pigment colorant comprises a mixture of pigment violet 23 and at least one cyan pigment.

2. The inkjet ink set of claim 1, wherein the cyan pigment in the blue inkjet ink is selected from the group consisting of pigment blue 15:3 and pigment blue 15:4.

3. The inkjet ink set of claim 1, wherein the total amount of pigment colorant present In the blue inkjet ink is at least about 1% by weight, based on the total weight of the ink.

4. The inkjet ink set of claim 1, wherein the vehicle in the blue inkjet ink is an aqueous vehicle.

5. The inkjet ink set of claim 1, wherein the weight ratio of the pigment violet 23 to the total amount of cyan pigment in the blue inkjet ink is from about 4:1 to about 1:4.

6. The inkjet ink set of claim 1, wherein the blue inkjet ink has a surface tension in the range of about 20 dyne/cm to about 70 dyne/cm at 25° C., and a viscosity of about 30 cP or less at 25C.

7. The inkjet ink set of claim 6, wherein, in the blue inkjet ink, the cyan pigment is selected from the group consisting of pigment blue 15:3 and pigment blue 15:4; the total amount of pigment colorant present is at least about 1% by weight, based on the total weight of the ink; and the weight ratio of the pigment violet 23 to the total amount of cyan pigment is from about 4:1 to about 1:4.

8. The inkjet ink set of claim 1, further comprising a cyan pigmented ink, a magenta pigmented ink and a yellow pigmented ink.

9. The inkjet ink set of claim 8, further comprising a green pigmented ink and a red pigmented ink.

10. The inkjet ink set of claims 8, further comprising a black ink.

11. An inkjet printer equipped with an inkjet ink set comprising a plurality of differently colored inkjet inks, wherein at least one of the inks is a blue inkjet ink comprising a pigment colorant and a vehicle, wherein the pigment colorant comprises a mixture of pigment violet 23 and at least one cyan pigment.

12. A method for ink jet printing onto a substrate, comprising the steps of:
  (a) providing an ink jet printer that is responsive to digital data signals;
  (b) loading the printer with a substrate to be printed;
  (c) loading the printer with an inkjet ink set comprising a plurality of differently colored inkjet inks, wherein at least one of the inks is a blue inkjet ink comprising a pigment colorant and a vehicle, wherein the pigment colorant comprises a mixture of pigment violet 23 and at least one cyan pigment; and
  (d) printing onto the substrate using the inkjet ink set in response to the digital data signals.

* * * * *